United States Patent
Shaver et al.

(10) Patent No.: US 7,679,852 B2
(45) Date of Patent: Mar. 16, 2010

(54) ADJUSTMENT OF READ/WRITE CLOCK EDGE TIMING

(75) Inventors: Jimmie Ray Shaver, Yukon, OK (US); Robert William Warren, Jr., Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 298 days.

(21) Appl. No.: 11/770,330

(22) Filed: Jun. 28, 2007

(65) Prior Publication Data

US 2009/0002866 A1    Jan. 1, 2009

(51) Int. Cl.
*G11B 5/09* (2006.01)
(52) U.S. Cl. .................................... 360/51
(58) Field of Classification Search .............. 360/51, 360/39, 48, 53
See application file for complete search history.

(56) References Cited

U.S. PATENT DOCUMENTS

| | | | |
|---|---|---|---|
| 5,255,383 A | 10/1993 | Lewis et al. | |
| 6,445,657 B2 * | 9/2002 | Koudo et al. | 369/47.34 |
| 6,529,456 B2 * | 3/2003 | Koudo et al. | 369/47.48 |
| 6,690,524 B1 | 2/2004 | Wakefield et al. | |
| 6,721,256 B2 * | 4/2004 | Fukuda et al. | 369/59.22 |
| 6,831,884 B2 * | 12/2004 | Hamada et al. | 369/47.28 |
| 7,136,239 B2 | 11/2006 | Fung et al. | |
| 7,248,552 B2 * | 7/2007 | Furumiya et al. | 369/53.13 |

\* cited by examiner

*Primary Examiner*—Fred Tzeng
(74) *Attorney, Agent, or Firm*—Westman, Champlin & Kelly, P.A.

(57) ABSTRACT

Apparatus and methods are disclosed that adjust the phase of a read/write clock signal. The read/write clock signal may be used in a data storage apparatus to regulate reading/writing on a data storage media. An apparatus includes an adjustment circuit that adjusts phase of an edge of a read/write clock signal based on the timing of information that is read from a data storage media. Another apparatus includes a servo circuit and a read/write channel circuit. The servo circuit generates a leading edge transition of a servo gate signal in response to a signal indicating that a read/write transducer is approaching a start of a servo wedge. The read/write channel circuit generates a trailing edge transition of the servo gate signal in response to occurrence of a defined time delay following the transducer reading a servo address mark from the servo wedge.

17 Claims, 10 Drawing Sheets

ADJUSTMENT OF READ/WRITE CLOCK EDGE TIMING

FIELD

The present invention generally relates to generation of clock signals and, more particularly, to adjusting the edge timing of a clock signal in a data storage device.

BACKGROUND

In data storage systems, such as disk drives, there is a need to be able to accurately detect data that has been stored on a storage media. For example, in a magnetic disk drive, data is stored as a coded series of magnetic transitions on the surface of a magnetic disk. An analog signal is formed by reading the magnetic transitions. The analog signal is sampled to detect bits, and the bits are decoded to recover the data. A clock signal controls the sampling of the analog signal and decoding of the detected bits.

SUMMARY

Embodiments of the present invention are directed to apparatus and methods that adjust the phase of a read/write clock signal, where the read/write clock signal may be used in a data storage apparatus to regulate reading/writing on a data storage media. In some embodiments, an apparatus includes an adjustment circuit that adjusts phase of an edge of a read/write clock signal based on the timing of information that is read from a data storage media.

In some other embodiments, an apparatus includes a servo circuit and a read/write channel circuit. The servo circuit generates a leading edge transition of a servo gate signal in response to a signal indicating that a read/write transducer is approaching a start of a servo wedge. The read/write channel circuit generates a trailing edge transition of the servo gate signal in response to occurrence of a defined time delay following the transducer reading a servo address mark from the servo wedge.

In yet some other embodiments, a method includes adjusting phase of an edge of a read/write clock signal based on timing of information read from a data storage media.

DETAILED DESCRIPTION

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
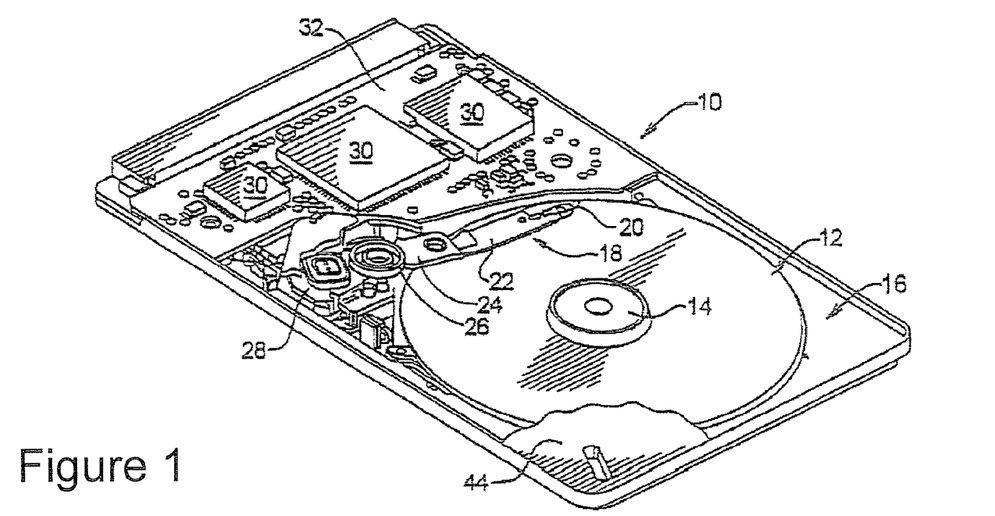
FIG. 1 is a block diagram of a disk drive with electronic circuits that are configured in accordance with some embodiments.

A simplified diagrammatic representation of a disk drive, generally designated as 10, is illustrated in FIG. 1. The disk drive 10 includes a data storage disk 12 (illustrated as a single disk) that is rotated by a spindle motor 14. The spindle motor 14 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

Although various embodiments are described in the context of a disk drive with a data storage disk, the invention is not limited thereto and is intended to cover, for example, other data storage devices that include data storage media. Such data storage media can include, but are not limited to, magnetic disks, optical disks, and magneto-optical disks.

The actuator arm assembly 18 includes a transducer 20 (or head) mounted to a flexure arm 22 which is attached to an actuator arm 24 that can rotate about a pivot bearing assembly 26. The transducer 20 may, for example, include a magnetoresistive (MR) element and/or a thin film inductive (TFI) element. The actuator arm assembly 18 also includes a motor 28, such as a voice coil motor (VCM), which radially moves the transducer 20 across the disk stack 12. The spindle motor 14 and actuator arm assembly 18 are coupled to a servo circuit, read/write channel circuit, data formatter circuit and other associated electronic circuits 30 which are configured in accordance with at least one embodiment of the present invention, and which can be enclosed within one or more integrated circuit packages mounted to a printed circuit board (PCB) 32. The electronic circuits 30 can include analog circuitry and/or digital circuitry, such as a gate array and/or microprocessor-based instruction processing device.

Figure 2:
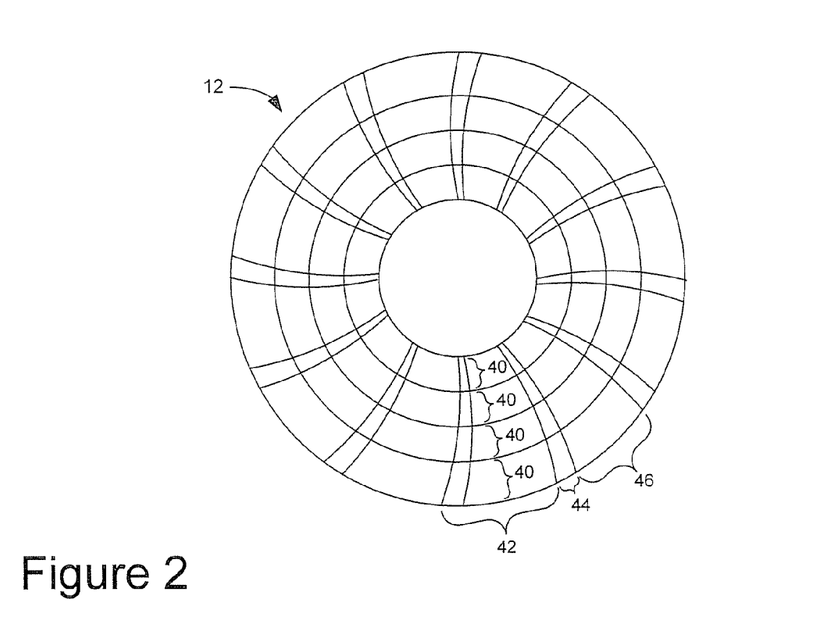
FIG. 2 is a top view of a disk that illustrates tracks, servo wedges, and data wedges.

FIG. 2 further illustrates tracks and sectors on the disk 12. Data is stored on the disk 12 within a number of concentric tracks 40 (or cylinders). Each track 40 is divided into a plurality of radially extending wedges 42. Each wedge is further sub-divided into a plurality of data wedges 46 defined between adjacent servo wedges 44. The servo wedges 44 are used to, among other things, accurately position the transducer 20 so that data can be properly written onto and read from sectors of the data wedges 46. The data sectors 46 are where non-servo related data (i.e., host data) is stored and retrieved.

Figure 3:
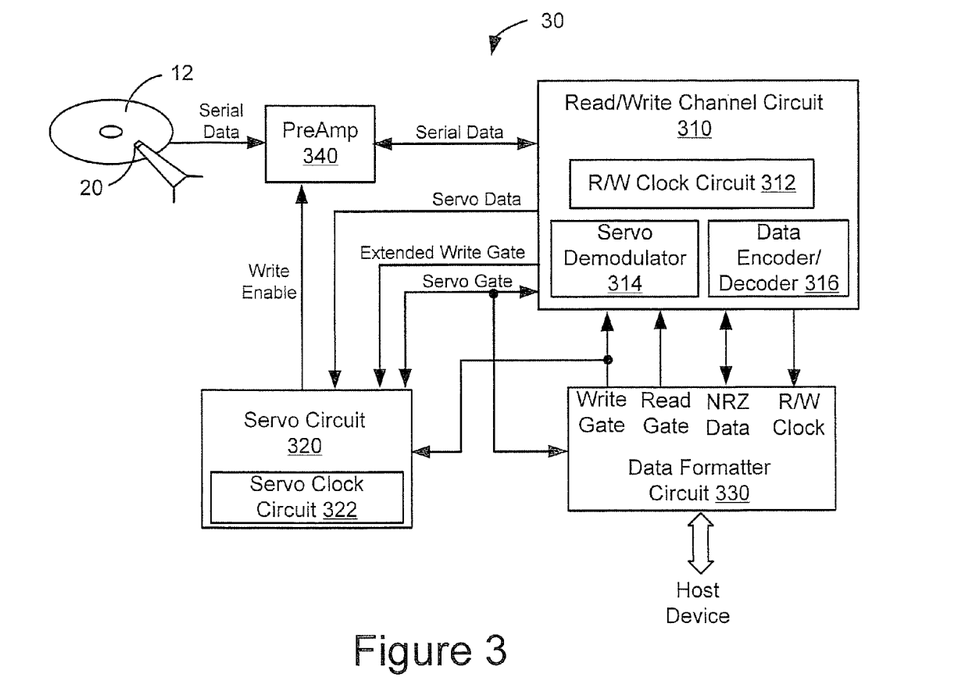
FIG. 3 is a block diagram of electronic circuits of a disk drive that include a read/write channel circuit, a servo circuit, and a data formatter circuit in accordance with some embodiments.

FIG. 3 is a block diagram of the electronic circuits 30, which include a read/write channel circuit 310, a servo circuit 320, a data formatter circuit 330, and a preamplifier 340 in accordance with some embodiments. The read/write channel circuit 310 includes a read/write clock circuit 312, a servo demodulator 314, and a data encoder/decoder 316. Although the read/write channel circuit 310, the servo circuit 320, the data formatter circuit 330, the preamplifier 340, and other elements have been shown as separate blocks for ease of illustration and discussion, it is to be understood that their functionality described herein may be integrated within a common integrated circuit package or distributed among a plurality of discrete integrated circuit packages.

The preamplifier 340 amplifies a read signal from the transducer 20, and provides the amplified read signal to the read/write channel circuit 310. The preamplifier 340 also amplifies a write signal from the read/write channel circuit 310 that is conducted through the transducer 20 to write on the disk 12.

Figure 4:
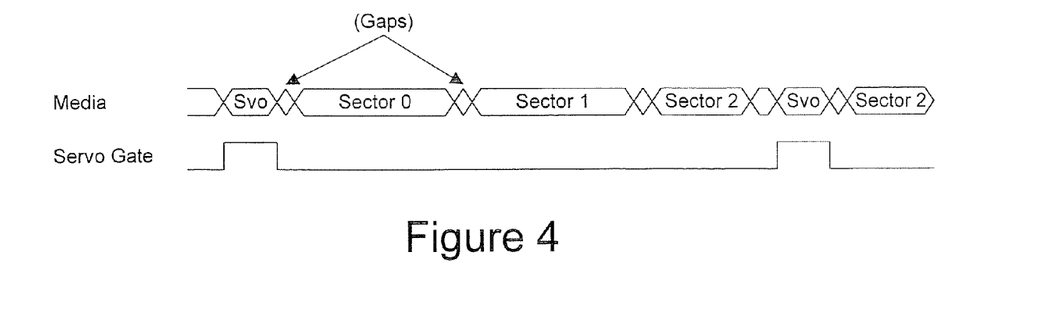
FIG. 4 is a graph illustrating an exemplary layout of servo wedges and data wedges, and a servo gate signal that is controlled to envelope each of the servo wedges as it is accessed by the read head.

The servo demodulator 314 demodulates servo data in the read signal as the transducer 20 reads the servo wedges 44. An example track layout on the disk 12 is shown in FIG. 4. The servo circuit 320 generates a servo gate signal having a logic "1" state that indicates the occurrence of the servo wedges ("servo") 44 and a logic "0" state that indicates the occurrence of data wedges 46 as the transducer 20 reads from the disk 12. The servo wedges 44 can include a phase-locked oscillator (PLO) field, a servo address mark (SAM) field, a binary coded track identification field, a wedge number field, and a servo burst field of circumferentially staggered radially offset servo bursts (e.g., A, B, C, D servo bursts). The data wedges can include a Phase-Locked-Oscillator (PLO) field, synchronization fields, user data, and error detection and correction data which are read/written in sectors (e.g., illustrated sectors 0-2). As will be described in further detail below, the servo demodulator 314 demodulates the servo wedges 44 to generate servo data which it communicates to the servo circuit 320.

The gaps shown in FIG. 4 are fields that are used to preserve appropriate distances between adjacent sectors and between servo wedges 44 and sectors. The length of the gaps is defined so as to compensate for timing uncertainty that occurs between predicted and actual locations of the transducer 20 relative to the disk 12. Variations in the angular velocity of the rotating disk 12, delays in synchronization of internal clock signals, and delays in detecting and responding to various timing marks on the disk 12 can contribute to such timing uncertainty and necessitate the use of larger gap lengths.

The servo circuit 320 controls the motor 28 to seek the transducer 20 to a target track and sector using the track identification field, the SAM, and the wedge number field read from the servo wedges 44. The servo circuit 320 may then maintain alignment of the transducer 20 relative to the target track using the servo burst fields read from the servo wedges 44.

The data encoder/decoder 316, of the read/write channel circuit 310, decodes data in the read signal as the transducer 20 reads the data wedges 46, and carries out error detection and correction on the decoded data to generated recovered data that is output to the data formatter circuit 330. The data encoder/decoder 360 may, for example, output non-return-to-zero (NRZ) formatted data. The data formatter circuit 330 combines the data from the data encoder/decoder 316 into blocks and may carry out further formatting of the data, and then communicates the formatted data to a host device. The data formatter circuit 330 also formats data from the host device into, for example, NRZ formatted data, that is output to the data encoder/decoder 316. The data encoder/decoder 316 encodes the data (e.g., adds error detection and error correction information) which is subsequently written through the preamplifier 340 and the transducer 20 onto the disk 12.

Because the data wedges 46 and the servo wedges 44 alternate repetitively along a track, the read/write channel circuit 310, the servo circuit 320, and the data formatter circuit 330 are configured to cooperatively identify the relative location and timing of the transducer 20 to the data wedges 46 and servo wedges 44. A servo gate signal communicated between the servo circuit 320 and the read/write channel circuit 310 is modulated to indicate whether the transducer 20 is reading one of the servo wedges 44 or one of the data wedges 46. The data formatter circuit 330 generates a read gate signal to cause the read/write channel circuit 310 to receive and decode data (via the data encoder/decoder circuit 316) when the servo gate signal indicates that the transducer 20 is reading a target sector in a target data wedge 45. The data formatter circuit 330 also generates a write gate that causes data that it outputs to the read/write channel circuit 310 to be encoded (via the data encoder/decoder circuit 316) and written through the preamplifier 340 and transducer 20 onto the disk 12. The servo circuit 320 generates a write enable signal in response to the write gate signal and the extended write gate signal to selectively enable and inhibit writing by the preamplifier 340 so as to allow writing in the data wedges 46 and to prevent writing in any of the servo wedges 44.

The servo circuit 320 operates in response to a servo clock signal that is generated by a servo clock circuit 322. The servo clock circuit 322 generates a fixed frequency servo clock signal which may have a frequency that corresponds to the nominal frequency of the PLO field or other data fields in the servo wedges 44. The servo clock circuit 322 may also be configured to align the phase of an edge transition of the servo clock signal to one or more timing events in the servo data, such as phase aligning to detection of a zero-crossing in the PLO field or other servo data fields.

The read/write channel circuit 310 and the data formatter circuit 330 operate in response to a read/write clock signal that is generated by a read/write clock circuit 312. In accordance with various embodiments, the data formatter circuit 330 can be synchronized to timing of certain information on the rotating disk 12, which can reduce timing uncertainty in the operation of the data formatter circuit 330 and the servo demodulator 314. Such reduced timing uncertainty may allow reduced gaps between sectors in data wedges 46, gaps between servo wedges 44 and data wedges 46, and/or size of certain data fields in the data wedges 46 and/or in the servo wedges 44. More particularly, the servo demodulator 314 and the data encode/decoder 316 may be configured to operatively cause the read/write clock circuit to align the phase of a transition edge (e.g., rising/falling edge) of the read/write clock signal to defined events that are repetitively detected in the read signal and which indicate the end of the servo wedges 44 (i.e., transducer 20 leaving the servo wedges). For example, the read/write clock circuit can be configured to align the phase of a transition edge of the read/write clock signal in response to the servo demodulator 314 detecting a SAM in a servo wedge 44.

The phase aligned read/write clock signal provides the data formatter circuit 330 with an accurate, predictable indication of the timing of defined events on the rotating disk 12. The data formatter circuit 330 may thereby operate with reduced uncertainty or "timing jitter" relative to the timing of defined events on the rotating disk 12 and may, thereby, allow use of shorter gap lengths and/or PLO field lengths, and may enable higher data capacities and/or linear bit densities to be achieved on the disk 12.

Figure 5:
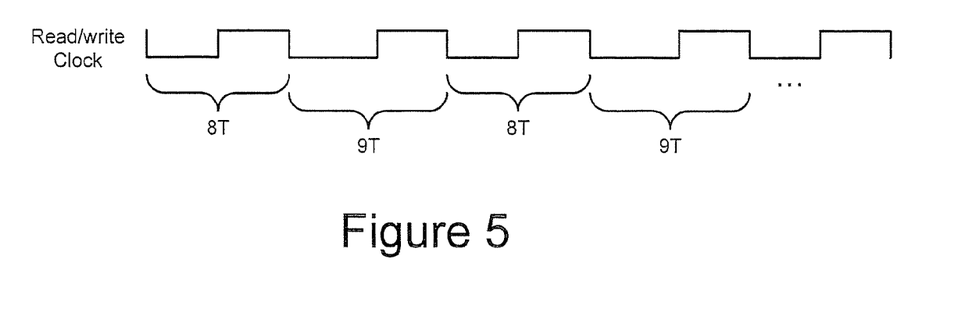
FIG. 5 is a graph illustrating a cadenced read/write clock signal that may be generated by the read/write clock circuit of FIG. 3.

FIG. 5 is a graph illustrating an exemplary read/write clock signal that may be generated by the read/write clock circuit of FIG. 3. The data formatter circuit 330 sends/receives data to/from the read/write channel circuit 310 via a data bus therebetween that is synchronized to the read/write clock signal. The read/write clock circuit 312 may generate the phase aligned read/write clock signal with a frequency matching the data symbol encoding/decoding rate of the data encoder/decoder 316. For example, if the data bus between the data formatter circuit 330 and the read/write channel circuit 310 has a width of 8 bits and if the data encoder/decoder 316 has an encoding/decoding rate of 32/34, then the read/write clock circuit 312 may produce a repeating cadence of read/write clock signal periods, such as 8T, 9T, 8T, 9T as shown in FIG. 5. The symbol T represents the period for bits written/read from the disk 12 by the read/write channel circuit 310.

The read/write clock circuit 312 may vary the frequency of the read/write clock signal in response to radial location of the transducer 20 so as to, for example, provide variable bit density across the disk 12. For example, the bit density at which data is written on the disk 12 can be varied for a plurality of radial zones across the disk 12. The read/write clock circuit 312 may be configured to incrementally increase/decrease the read/write clock signal frequency depending upon which of the plurality of radial zones the transducer 20 is reading/writing data. In contrast, the servo clock circuit 322 may generate a constant frequency servo clock signal irrespective of the radial location of the transducer 20.

Figure 6:
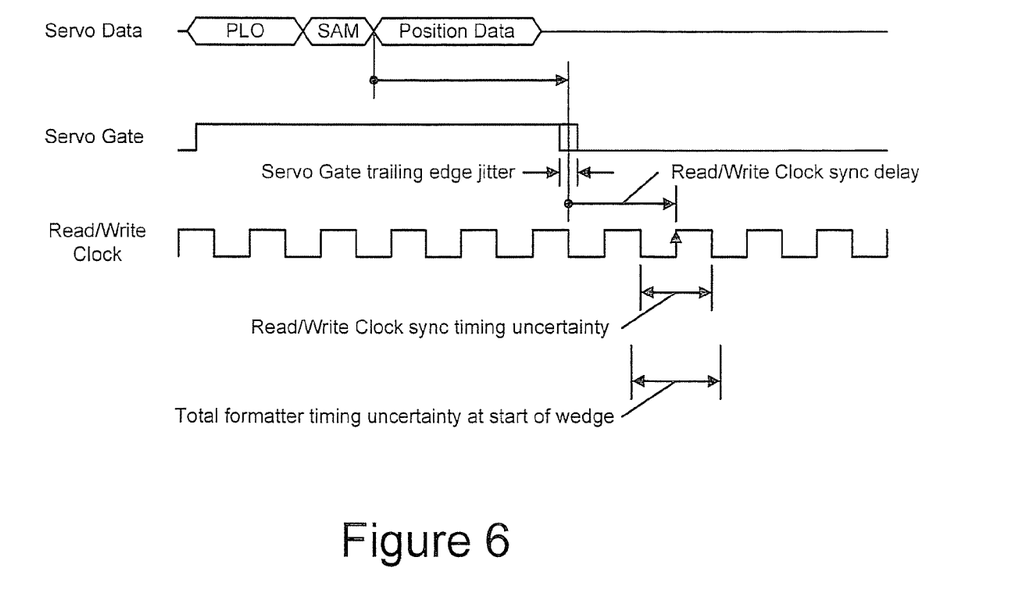
FIG. 6 is a graph illustrating relative timing between a servo data, a servo gate signal, and a read/write clock signal, and timing uncertainty that may arise therebetween.

If the read/write clock signal were not phase aligned based on timing of defined events on the rotating disk 12, the read/write clock signal would have an arbitrary phase relationship to the rotating disk 12 at the beginning of a data wedge 46 (after a servo field has been recovered by the servo demodulator 314). Such an arbitrary phase relationship causes timing uncertainty between the read/write clock signal periods and when the data formatter circuit 330 should properly assert the read gate signal or the write gate signal to transfer data to the read/write channel circuit 310 for reading/writing on the disk 12. Additionally, the trailing edge of the servo gate signal, which indicates the end of a servo wedge 44, may be synchronized to a clock that is not phase-locked to servo data on the disk 12 and may cause additional timing uncertainty in the operation of the data formatter circuit 330. FIG. 6 illustrates such exemplary combined timing uncertainty.

With reference to FIG. 6, without phase synchronization between the read/write clock signal and timing of defined events on the rotating disk 12, the trailing edge of the servo gate signal may have arbitrary timing relative to the read/write clock signal, which is illustrated as a range of servo gate trailing edge jitter. Accordingly, the data formatter circuit 330 incurs timing uncertainty (read/write clock sync timing uncertainty) between the trailing edge of the servo gate signal, indicating the end of the servo wedge 44, and the subsequent start of a data wedge 46.

The combined timing uncertainty and operation of the data formatter circuit 330 at the beginning of a data wedge 46 is partially dependent upon the frequency of the servo clock signal operating the servo circuit 320 and the frequency of the read/write clock signal operating the data formatter circuit 330 and the data bus communications with the read/write channel circuit 310. A typical value for the range of servo gate trailing edge jitter may be 10 nanoseconds (based on a 100 MHz clock), a typical value for the read/write clock signal period may be 20 nanoseconds (based on a 500 MHz disk data rate and a 10-bit data bus between the circuit 310 and 330). The corresponding timing uncertainty in the data formatter circuit 330 at the beginning of a data wedge 46 may therefore be 30 nanoseconds.

Figure 7:
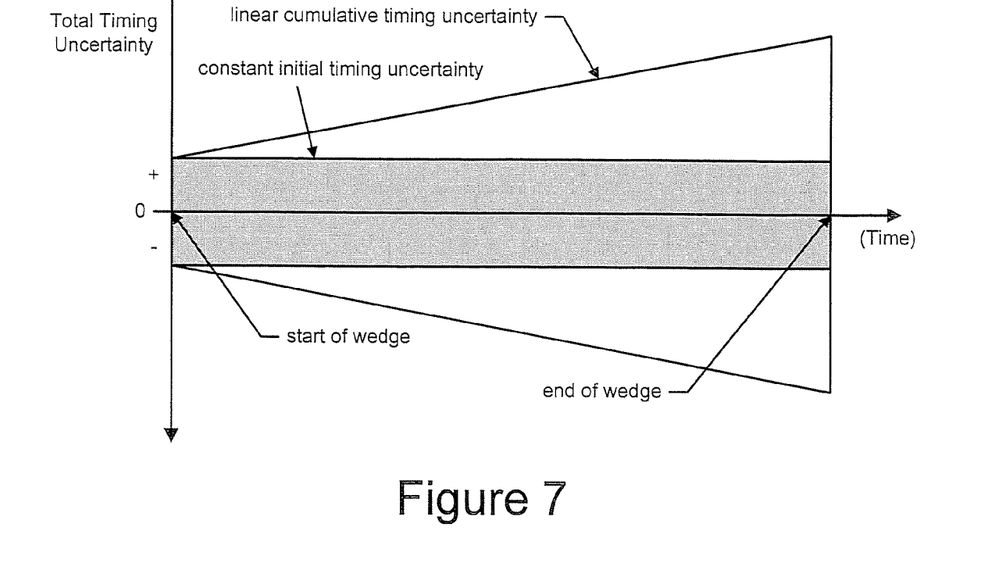
FIG. 7 is a graph illustrating an exemplary profile of accumulated timing uncertainty that may occur following the start of a servo wedge.

FIG. 7 is a graph illustrating an exemplary profile of accumulated timing uncertainty that may occur following the start of a servo wedge when the read/write clock signal is not phase aligned based on timing of defined events on the rotating disk 12. In view of the above exemplary values, the timing uncertainty can be represented by a nominal delay of +/−15 nanoseconds. In FIG. 7, the shaded rectangles adjacent to both sides of the horizontal axis represent the plus and minus timing uncertainty relative to the nominal (zero) position. For example, variations in the speed of the data wedge 46, such as due to spindle motor 14 speed variations and/or asymmetrical servo tracks, the timing uncertainty and operation of the data formatter circuit 330 linearly increases from the beginning of the data wedge 46. Such accumulated growth in the timing uncertainty is represented by the corresponding pair of sloped plus/minus total timing uncertainty lines.

Figure 8:
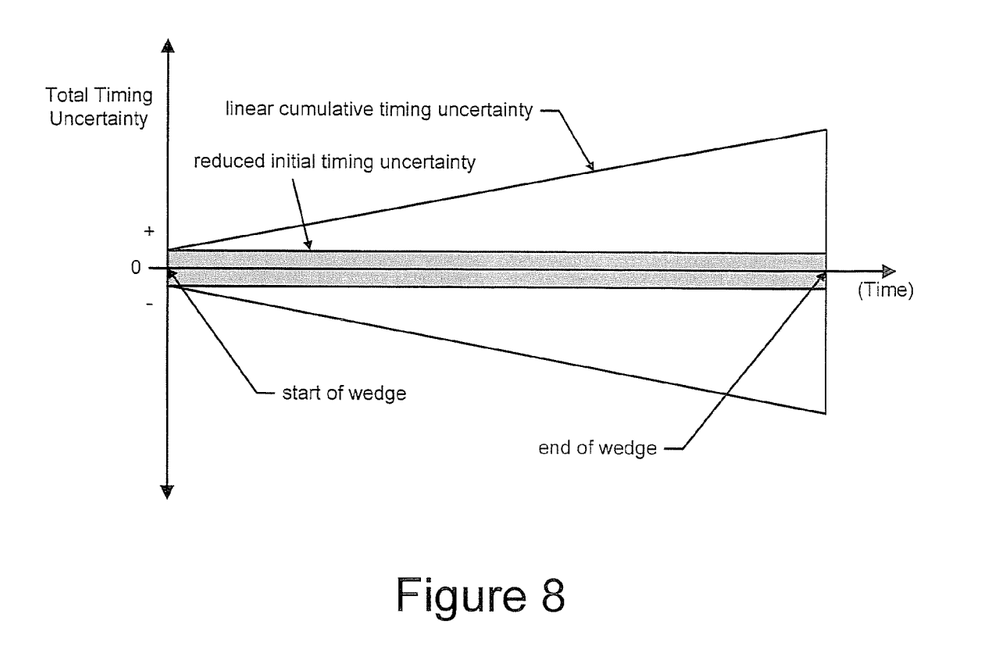
FIG. 8 is a graph illustrating an exemplary profile of accumulated timing uncertainty that may occur following the start of a servo wedge when the phase of an edge of a read/write clock signal, which may operate the read/write channel circuit and the data formatter circuit, is adjusted based on timing of a servo address mark read from the disk.

In sharp contrast, when the read/write clock signal is phase aligned based on timing of defined events in the rotating disk 12, the initial timing uncertainty at the start of a data wedge 46 may be substantially reduced. FIG. 8 is a graph illustrating an exemplary profile of accumulated timing uncertainty that may occur following the start of a servo wedge when the phase of an edge of the read/write clock signal is adjusted based on timing of a servo address mark read from the disk. Comparing FIGS. 7 and 8, it is observed that the initial timing uncertainty at the start of a data wedge 46 has been substantially reduced. Accordingly, the accumulated growth in timing uncertainty following the beginning of the data wedge 46 when the read/write clock signal is phase adjusted (FIG. 8) is less than the accumulated growth in timing uncertainty occurring when the read/write clock signal is not phase adjusted (FIG. 7).

Figure 9:
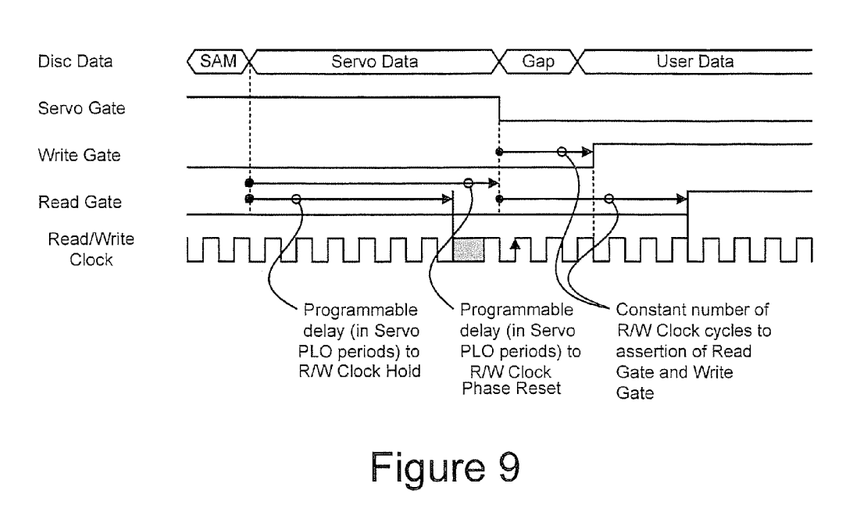
FIG. 9 is a graph illustrating relative timing between servo data and the triggering of deassertion of a servo gate signal, assertion of a write gate signal, assertion of a read gate signal, and phase adjustment made to the edge of a read/write clock.

Various operations of the read/write channel circuit 310, the servo circuit 320, and the data formatter circuit 330 to phase synchronize and use the read/write clock signal will now be described with regard to FIG. 9. FIG. 9 is a graph illustrating relative timing between certain servo data and the triggering of deassertion of the servo gate signal, assertion of the write gate signal, assertion of the read gate signal, and phase adjustment to the edge of the read/write clock.

Referring to FIG. 9, the servo circuit 320 generates the leading edge (rising edge) transition of the servo gate signal in response to the transducer 20 entering the servo wedge 44. As the transducer 20 reads the servo wedge 44, the servo demodulator 314 recovers the servo data from the read signal. In response to detecting the SAM in the read signal, the servo demodulator 314 delays a defined number of PLO cycles in the read signal (or may delay a defined number of read/write clock signal cycles) and then generates the trailing edge (falling edge) transition of the servo gate signal and triggers the read/write clock circuit 312 to reset the phase of the read/write clock signal at the trailing edge of the servo gate signal. Because the PLO in the read signal is in phase with the servo data on the disk 12, it can provide a highly accurate time reference relative to the rotating disk 12.

In response to the trailing edge transition of the servo gate signal, the data formatter circuit 330 internally resynchronizes its operation to the read/write clock signal (or to an internally buffered version of the read/write clock signal). The data formatter circuit 330 then delays a defined number of read/write clock signal periods before asserting the read gate or the write gate. Because the phase of an edge of the read/write clock signal has been reset by the read/write clock circuit 312 to match the phase of the trailing edge transition of the servo gate signal, and because the trailing edge transition of the servo gate signal is synchronized to the servo PLO and the read signal to reduce its jitter relative to the rotating disk 12, the data formatter circuit 330 may operate with significantly more accurately timed read and write operation timing relative to the rotating disk 12 (i.e., significantly reduce timing uncertainty).

By way of a particular example, the timing accuracy of the operation of the data formatter circuit 330 relative to the phase of the read/write clock signal may be improved to about 1 read/write frequency synthesizer bit-time, which, for the above exemplary example, may correspond to a reduction in timing uncertainty from about 30 nanoseconds to about 2 nanoseconds (where one data bit-time at 500 MHz equals 2 nanoseconds).

As shown in FIG. 9, adjustment of the phase of an edge of the read/write clock signal (re-phase) is delayed a defined number of servo PLO cycles from the SAM signal before the read/write clock circuit 312 freezes the read/write clock signal, such as by holding the read/write clock signal at a low value. Delaying adjustment of the phase of an edge of the read/write clock signal in this manner may avoid/prevent generation of glitches or short cycles in the read/write clock signal. The read/write clock circuit 312 subsequently waits another defined number of servo PLO cycles before it restarts the read/write clock signal with a trailing edge coincident with, or just after, the trailing edge transition of the servo gate signal. The difference between the defined delays may be relatively short, such as just sufficient to create a stretched read/write clock signal cycle following the trailing edge transition of the servo gate signal. Because the data formatter circuit 330 may be relatively idle during this time period, while servo data recovery is being carried out, temporarily freezing the read/write clock signal may not have a deleterious effect on the operation of the data formatter circuit 330.

Figure 10:
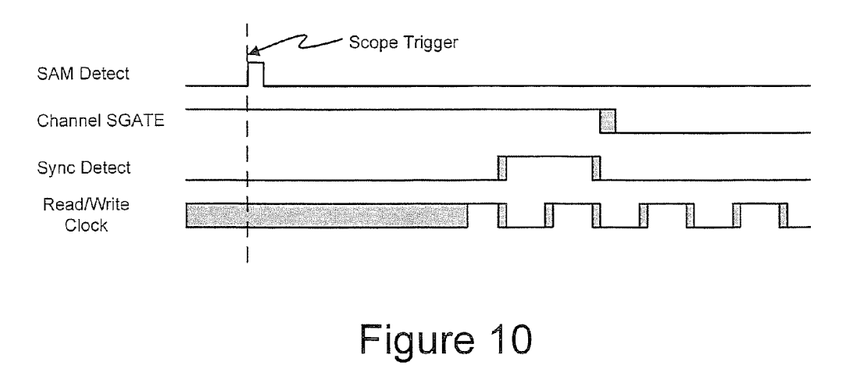
FIG. 10 illustrates exemplary graphs that may be displayed by an oscilloscope that is set to a persistence mode, and shows relative amounts of jitter that may occur in the read/write clock signal before and after edge phase adjustment of the read/write clock signal based on timing of the servo address mark.

FIG. 10 illustrates exemplary graphs that may be displayed by an oscilloscope that is set to a persistence mode, and shows relative amounts of jitter that may occur in the read/write clock signal before and after edge phase adjustment of the read/write clock signal based on timing of the servo address mark. The exemplary oscilloscope would be set to trigger on detection of the SAM in the read signal, thereby providing a fixed timing reference relative to the servo wedges 44 on the rotating disk 12. Over time, the traces would indicate an arbitrarily varying phase of the read/write clock signal before the end of the servo field and, afterwards, a substantially constant phase of the read/write clock signal with about one read/write frequency synthesizer bit-period of jitter range. The amount of timing jitter in the trailing edge transition of the servo gate signal may also be significantly reduced, because the trailing edge transition is generated synchronously with the servo PLO. which is phase locked to the servo signal read from the servo wedges 44 on the rotating disk 12.

As described above, the servo circuit 320 can generate the leading edge transition to assert the servo gate signal, and the read/write channel circuit 310 can generate the trailing edge transition to deasssert the servo gate signal. Accordingly, the servo gate signal can be bidirectionally driven by the servo circuit 320 and the read/write channel circuit 310. The servo circuit 320 is responsible for initially asserting the servo gate signal, and the read/write channel circuit 310 takes over driving of the servo gate signal a short distance into the servo field so that it can generate the trailing edge transition. When the read/write channel circuit 310 and the servo circuit 320 are embodied in two separate and distinct integrated circuit (IC) chips, it may be advantageous to maintain a single IC pin for communication of the servo gate signal therebetween, because adding additional IC pins may increase their manufacturing cost.

Figure 11:
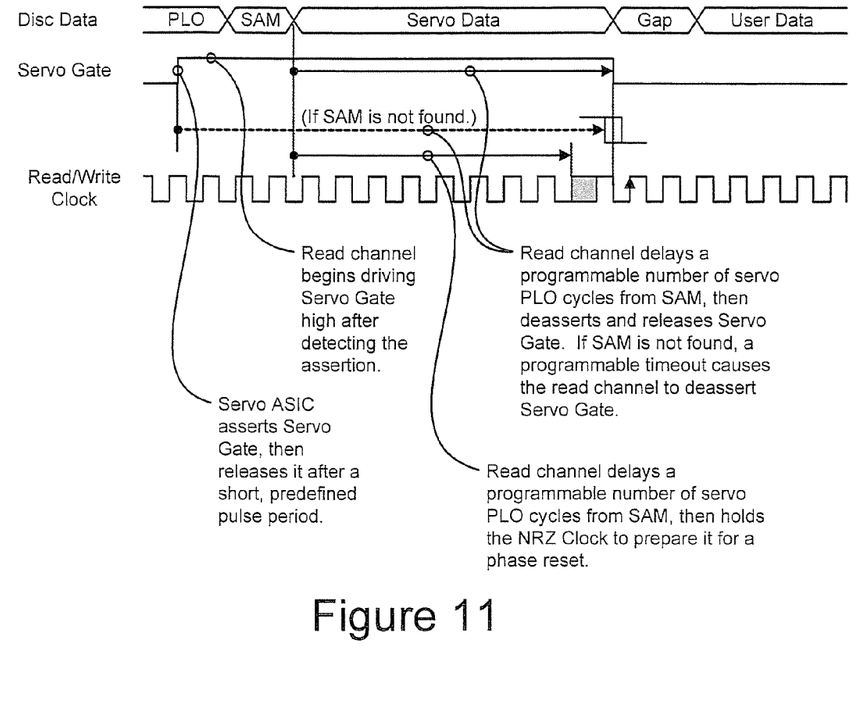
FIG. 11 is a graph illustrating relative timing between disk data, the servo gate signal, and phase adjustment of the read/write clock signal.

FIG. 11 is a graph illustrating further operations of the read/write channel circuit 310 and the servo circuit 320 and relative timing between the disk data, the servo gate signal, and edge phase adjustment of the read/write clock signal. Referring to FIG. 11, the servo circuit 320 drives the servo gate signal high (generates the leading edge transition) during the PLO field. The read/write channel circuit 310 (e.g., the servo demodulator 314) responds to the rising edge of the servo gate signal by beginning the servo data recovery operations and by driving the servo gate signal high for the remainder of the servo data recovery time. The servo circuit 320 releases the servo gate signal a defined delay after it asserts the signal, where the delay is sufficient such that the read/write channel circuit 310 is driving the servo gate signal high before the servo circuit 320 releases the servo gate signal. At the end of the servo wedge 44, the read/write channel circuit 310 drives the servo gate signal low (generates the trailing edge transition) for a short pulse period and then stops driving to leave the servo gate signal low. The servo circuit 320 may then drive the servo gate signal low for the remainder of the data wedge 46 in response to timing-out after a defined amount of time following the rising edge of the servo gate signal or in response to observing the trailing edge of the servo gate signal.

Because the read/write channel circuit 310 drives the servo gate signal low before releasing it, the slew rate to the trailing edge transition of the servo gate signal may thereby be controlled. It may be important for operation of the data formatter circuit 330 to cause a fast slew rate for the trailing edge transition of the servo gate signal relative to the read/write clock signal speed to attempt to provide constant phase relationship between transition of the servo gate signal and the read/write clock signal (e.g. between the trailing edge transition of the servo gate signal and the subsequent rising edge of the read/write clock signal).

Figure 12:
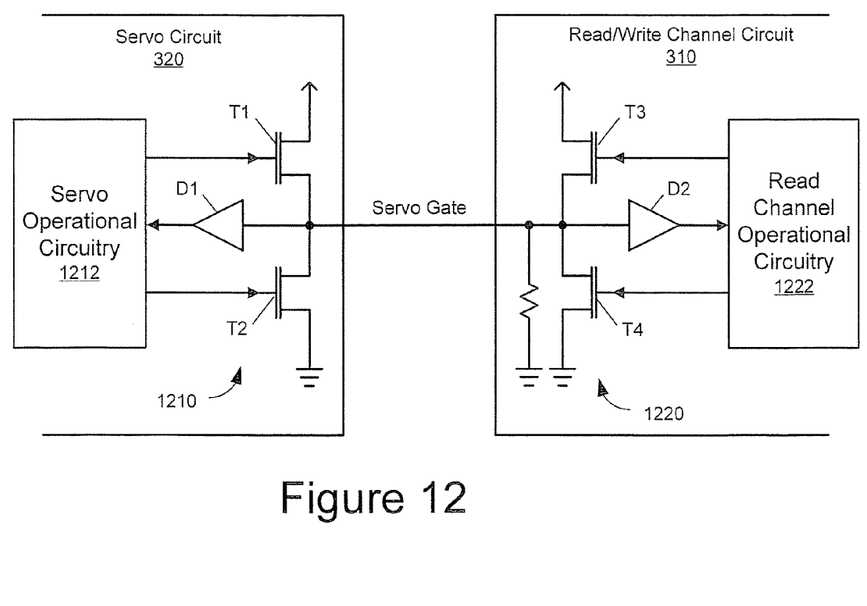
FIG. 12 is a circuit diagram of driver circuits that may be used in the servo circuit and the read/write channel circuit of FIG. 3 to bidirectionally drive the servo gate signal.

FIG. 12 is a circuit diagram of driver circuits that may be used within the servo circuit 320 and the read/write channel circuit 310 of FIG. 3 to bidirectionally drive the servo gate signal. Referring to FIG. 12, a bidirectional driver 1210 in the servo circuit 320 includes a pair of transistors T1 and T2 that are configured to drive the servo gate signal in response to a signal from other servo operational circuitry 1212. When the read/write channel circuit 310 drives the servo gate signal, an amplifier D1 conducts the signal to the servo operational circuitry 1212. Similarly, the read/write channel circuit 310 includes a bidirectional driver 1220 having a pair of transistors T3 and T4 that are configured to drive the servo gate signal in response to a signal from read channel operational circuitry 1222. When the servo circuit 320 drives the servo gate signal, an amplifier D2 conducts the signal to the read channel operational circuitry 1222.

Alternatively, when the relevant functionalities of the servo circuit 320 and the read/write channel circuit 310 are integrated into a common chip package, the servo gate signal and associated control protocol may be split into two or more separate signals, with the servo circuit functionality and the read/write channel circuit functionality driving different servo gate signals. The servo circuit functionality can generate a servo gate start pulse at the beginning of the servo recovery process, and the read/write channel circuit functionality can generate a servo gate end pulse at the end of the servo recovery process, with the read/write clock signal edge phase adjusted in response to the rising edge of the servo gate end pulse.

Figure 13:
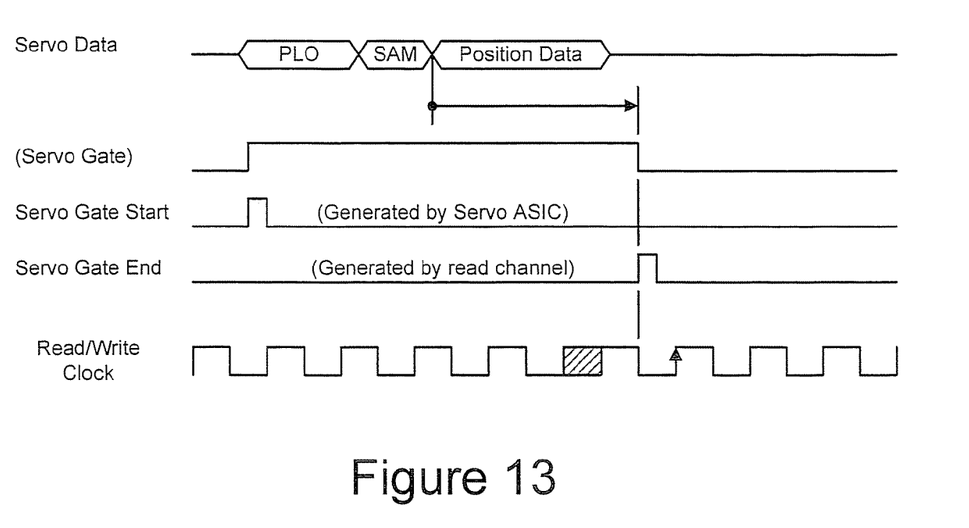
FIG. 13 is a graph illustrating relative timing between the servo data, the servo circuit driving the servo gate signal, and the read/write channel circuit subsequently driving the servo gate signal.

FIG. 13 is a graph illustrating relative timing between the servo data, the servo circuit 320 driving the servo gate signal, and the read/write channel circuit 310 subsequently driving the servo gate signal. Referring to FIG. 13, the servo circuit 320 drives the servo gate signal high (asserts) during the PLO in the read signal. The read/write channel circuit 310 subsequently drives the servo gate signal low (deasserts) a defined time delay (e.g., a defined number of cycles of the PLO) following detection of the SAM in the read signal. As described above, the read/write clock circuit 312 freezes the read/write clock signal the defined time delay (e.g., defined number of cycles of the PLO) following detection of the SAM, and generates a rising edge of the read/write clock signal another defined time delay after the following edge of the servo gate signal.

As described above, user data can be stored in blocks, called sectors, in the data wedges 46 on the disk 12. A typical sector size is 512 bytes of user data, although various other sector sizes can be used. For example, some typical sector sizes include, but are not limited to, 520 bytes, 528 bytes, 1024 bytes, and 4096 bytes. However, it is noted that the sector size is not necessarily based on a power of two.

Figure 14:
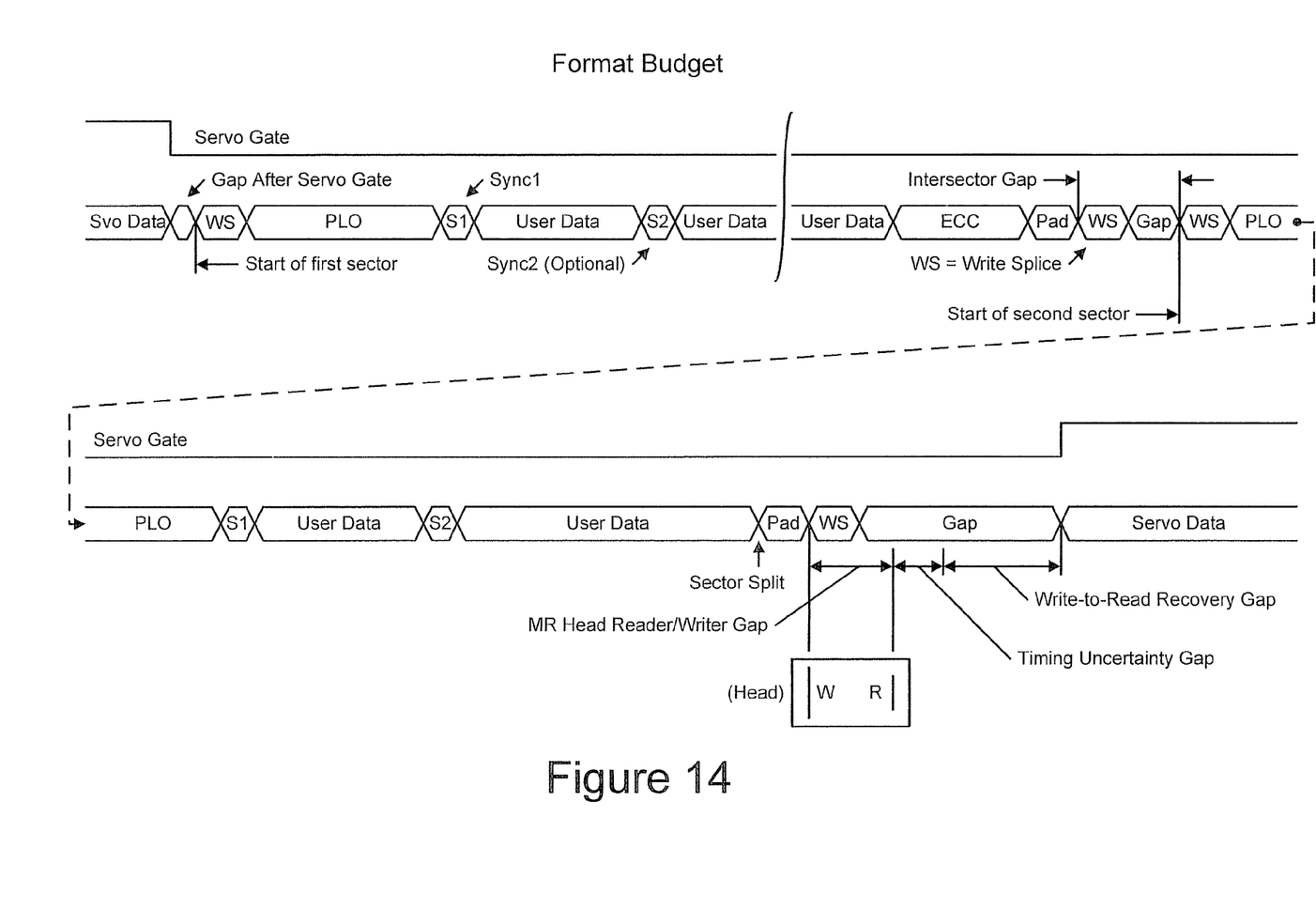
FIG. 14 is a graph illustrating a relative format budget that may be allocated for data recorded in servo wedges and data wedges along a disk and the associated actuation of a servo gate signal.

Because the disk drive 10 is a random access device, any number of sequential sectors can be written, although sectors immediately prior to or subsequent to the written sector, in some disk drives, may not be written. Similarly, sector read operations can include any number of sequential sectors starting and ending at any position along a track. Therefore, each sector typically contains fields that allowed to be read and written independently of other sectors on the track. FIG. 14 illustrates exemplary fields that may be included in tracks to facilitate reading and writing in the track sectors. It is noted that the upper or lower parts of the drawings are contiguous in time, as indicated by the dotted arrow connecting them.

Referring to FIG. 14, each PLO field represents a portion of the disk media that stores a data pattern that is used to phase lock the data recovery circuits of the servo demodulator 314. The inter-sector field represents a length on the media that should be left nominally vacant between the nominal positions of two adjacent sectors. The PLO fields in the inter-sector gap fields represent overhead associated with the data storage format budget (capacity) of the disk 12. The write splice (WS) field represents a length of media that should be reserved to compensate for a time delay between when the preamplifier 340 is turned on, in response to the write enable signal from the Servo circuit 320, to when amplitude of the write current from the preamplifier 340 has reached a defined threshold (e.g., 90% of its saturation value).

Because the read/write clock signal is phase aligned relative to the SAM, it can be used to more accurately predict the location of the transducer within the servo wedges 44 and the data wedges 46. Accordingly, timing uncertainty in the operation of the data formatter circuit 330 can be reduced, which may allow increased media format efficiency, such as will be described below with regard to FIGS. 15-16.

Figure 15:
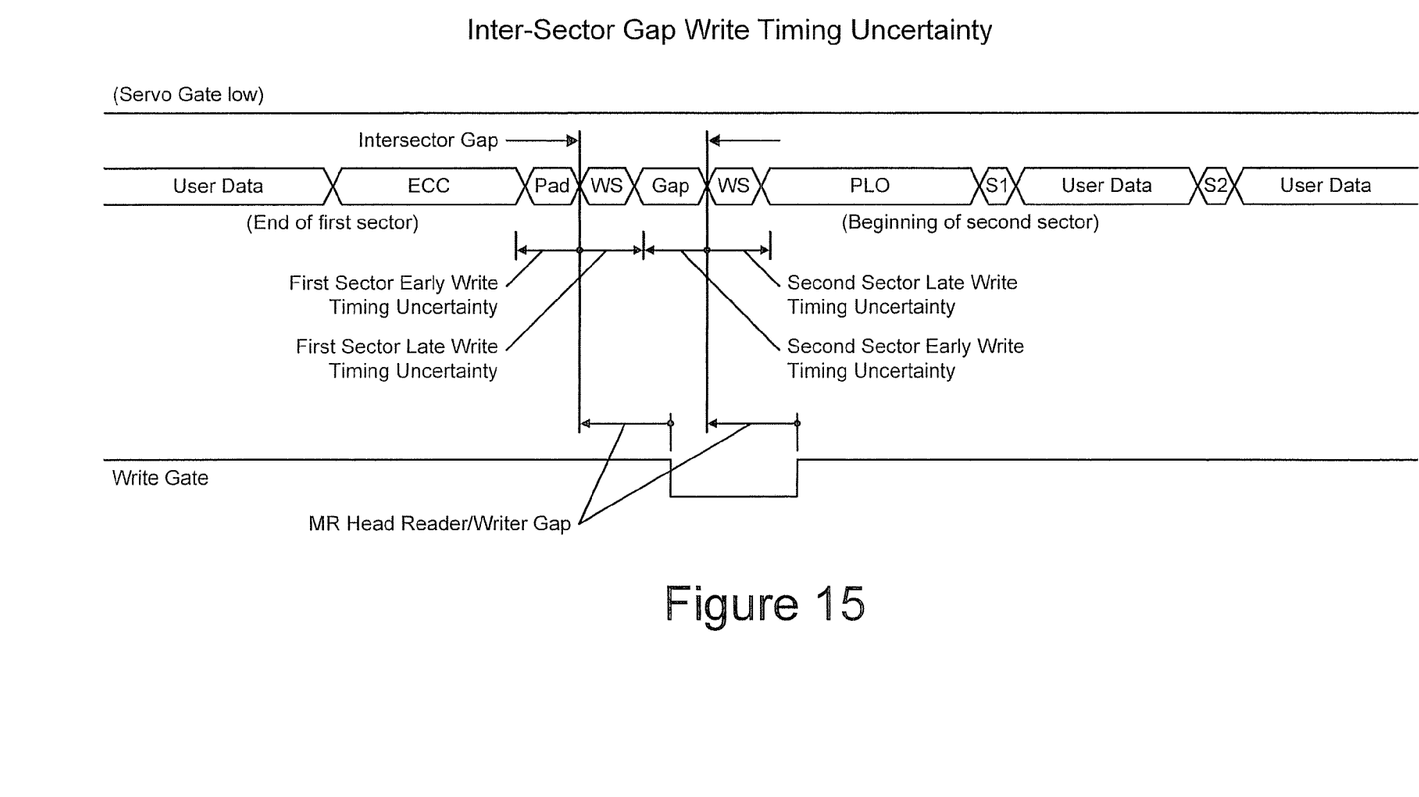
FIG. 15 is a graph illustrating exemplary inter-sector write timing uncertainty relative to data wedges along a disk and further illustrates an associated servo gate signal and write gate signal.

Referring to FIG. 15, the inter-sector gap field is defined to be sufficiently large so as to compensate for timing uncertainty between when writing stops relative to the end of one sector on the disk 12 and timing uncertainty when writing begins relative to the beginning of a subsequent sector during another revolution of the disk 12. Accordingly, the inter-sector gap field is defined to be sufficiently large so that two adjacent sectors do not overlap one another, even when one sector is written at one time and other sectors are written a relatively long time later (e.g., minutes, hours, or weeks later). Because the read/write clock signal is phase adjusted, the read timing and write timing relative to the disk sectors can be more accurately determined. For example, the write timing uncertainty may be reduced by at least one symbol size and, accordingly, the inter-sector gap can be correspondingly reduced by one symbol size (typically 8 or 10 bits per symbol).

Figure 16:
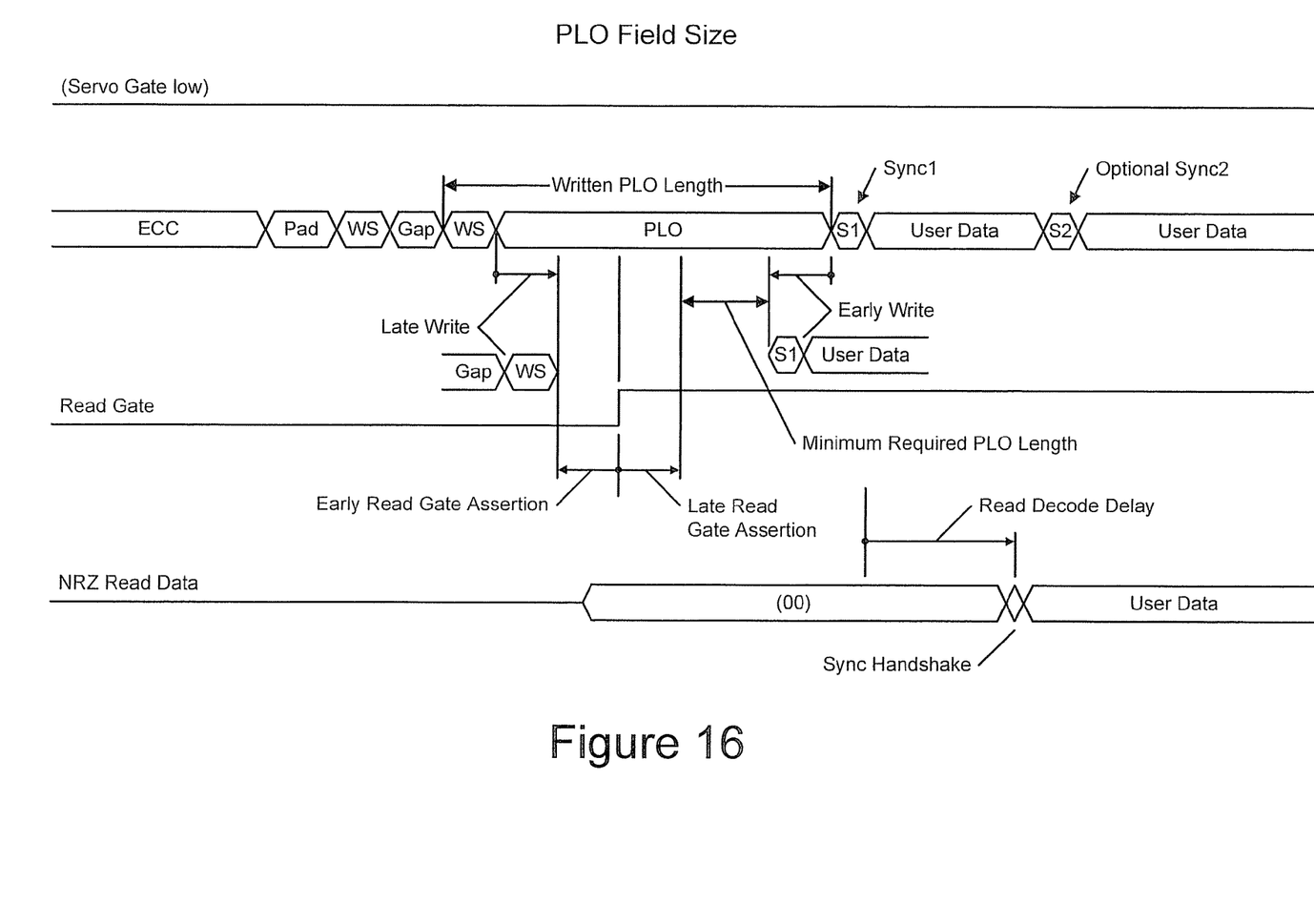
FIG. 16 is a graph illustrating the effect of reducing timing uncertainty on the size of the PLO field in a data wedge of a disk.

FIG. 16 illustrates how the PLO field size may be influenced by uncertainty in the timing of the transducer 20 relative to the information on the rotating disk 12 during a write operation and/or read operation. FIG. 16 also illustrates how reducing such timing uncertainty can reduce the size of the PLO field. The PLO field is sized based on a minimum amount of PLO data typically required by the read/write channel circuit 310 to recover user data from sectors, and its size is further increased to include an additional amount of PLO data that is written to compensate for timing uncertainty associated with write operations and/or read operations. As illustrated in FIG. 16, the additional amount of PLO data used to compensate for such timing uncertainty may be determined based on a combination of the amount of early uncertainty in the starting location for writing, the amount of late uncertainty in the starting location for writing, the amount of early uncertainty in the starting location for reading, and the amount of late uncertainty in the starting location for reading. Because the read/write clock signal is phase adjusted based on timing information (SAM timing) read from the disk 12, the combined write timing uncertainty may be reduced by at least one data symbol size and the combined read timing uncertainty may be reduced by at least one data symbol size. Consequently, the length of the PLO field may be reduced by at least two data symbol lengths (e.g., typically 8 or 10 bits per data symbol length).

There may be about one inter-sector gap field for each user data sector along a track on the disk 12, and there may be a least one PLO field for each user data sector along the track. Moreover, sectors that are split across Servo Fields typically require an additional PLO field for each such split. Because a typical data track can contain more than 500 user data sectors, and may contain 1000 or more sectors in some disk drives, reducing the overhead for each user data sector by at least three data symbol lengths may provide sufficient room to add one or more additional sectors to each data track. The data storage capacity of the disk drive may thereby be increased by adjusting the phase of the read/write clock signal as described above.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An apparatus comprising:
a read/write channel circuit that generates a trailing edge transition of a servo gate signal based on timing of a servo address mark read from a data storage media; and
an adjustment circuit that adjusts phase of an edge of a read/write clock signal based on timing of information read from the data storage media, wherein the adjustment circuit adjusts the phase of the edge of the read/write clock signal in response to the trailing edge transition of the servo gate signal based on timing of the servo address mark read from the data storage media.

2. The apparatus of claim 1, wherein the adjustment circuit adjusts phase of an edge of the read/write clock signal in response to occurrence of a defined number of phase locked oscillator cycles read from the data storage media following detection of the servo address mark read from the data storage media.

3. The apparatus of claim 1, wherein the adjustment circuit freezes the read/write clock signal in response to occurrence of a defined number of phase locked oscillator cycles read from the data storage media following reading of the servo address mark on the data storage media, and resumes cycling of the read/write clock signal with a transition edge that is aligned to a defined time delay relative to occurrence of the trailing edge transition of the servo gate signal.

4. The apparatus of claim 1, further comprising a servo circuit that generates a leading edge transition of the servo gate signal in response to a read/write transducer approaching a start of a servo wedge, and wherein the adjustment circuit generates the trailing edge transition of the servo gate signal in response to occurrence of a defined time delay following the transducer reading the servo address mark from the servo wedge.

5. The apparatus of claim 4, wherein the adjustment circuit generates the trailing edge transition of the servo gate signal in response to occurrence of a defined number of phase locked oscillator cycles read by the transducer from the servo wedge following the transducer reading the servo address mark from the data wedge.

6. The apparatus of claim 1, wherein the adjustment circuit adjusts the phase of an edge of the read/write clock signal during a read/write inhibit gap on the data storage media between servo data and user data.

7. The apparatus of claim 1, further comprising:
a data decoder that decodes data read from the data storage media in response to cycles of the phase adjusted read/write clock signal.

8. The apparatus of claim 7, further comprising a data formatter circuit that operates in response to cycles of the phase adjusted read/write clock signal to format data decoded by the data decoder for communication to a host device.

9. The apparatus of claim 7, wherein the data decoder and the adjustment circuit are within a read/write channel integrated circuit that operates in response to cycles of the phase adjusted read/write clock signal.

10. The apparatus of claim 1, wherein the adjustment circuit varies frequency of the read/write clock signal in response to a radial location on a data storage media where data is to be read and/or written.

11. An apparatus comprising:
a servo circuit that generates a leading edge transition of a servo gate signal in response to a signal indicating that a read/write transducer is approaching a start of a servo wedge; and
a read/write channel circuit that generates a trailing edge transition of the servo gate signal in response to occurrence of a defined time delay following the transducer reading a servo address mark from the servo wedge.

12. The apparatus of claim 11, wherein the read/write channel circuit enables servo data recovery in response to the leading edge transition of the servo gate signal and enables data wedge reading/writing in response to the trailing edge transition of the servo gate signal.

13. The apparatus of claim 11, wherein the read/write channel circuit adjusts phase of an edge of a read/write clock signal based on timing of the servo address mark read from the servo wedge.

14. The apparatus of claim 13, wherein the read/write channel circuit adjusts phase of an edge of the read/write clock signal in response to occurrence of a defined number of phase locked oscillator cycles read from the servo wedge following reading of the servo address mark.

15. The apparatus of claim 11, wherein:
the servo circuit and the read/write channel circuit are enclosed with separate integrated circuit packages; and the servo circuit and the read/write channel circuit bidirectionally drive the servo gate signal through a single connector pin on both of the separate integrated circuit packages.

16. A method comprising:
adjusting phase of an edge of a read/write clock signal in response to occurrence of a defined number of phase locked oscillator cycles read from a data storage media following detection of a servo address mark read from the data storage media.

17. The method of claim 16, further comprising:
generating a leading edge transition of a servo gate signal in response to a read/write transducer approaching a start of a servo wedge; and
generating a trailing edge transition of the servo gate signal in response to occurrence of a defined time delay following the transducer reading the servo address mark from the servo wedge.

* * * * *